US011690055B2

(12) United States Patent
Stauffer et al.

(10) Patent No.: US 11,690,055 B2
(45) Date of Patent: *Jun. 27, 2023

(54) RESOURCE ALLOCATION ACROSS COEXISTING RADIO ACCESS TECHNOLOGIES

(71) Applicant: GOOGLE LLC, Mountain View, CA (US)

(72) Inventors: Erik Stauffer, Mountain View, CA (US); Jibing Wang, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/736,277

(22) Filed: May 4, 2022

(65) Prior Publication Data

US 2022/0264552 A1    Aug. 18, 2022

Related U.S. Application Data

(63) Continuation of application No. 17/413,494, filed as application No. PCT/US2020/013134 on Jan. 10, 2020.

(Continued)

(51) Int. Cl.
*H04W 72/044* (2023.01)
*H04W 16/14* (2009.01)

(52) U.S. Cl.
CPC ......... *H04W 72/046* (2013.01); *H04W 16/14* (2013.01)

(58) Field of Classification Search
None
See application file for complete search history.

(56) References Cited

U.S. PATENT DOCUMENTS 9,025,556 B2 * 5/2015 Krishnamurthy ... H04W 72/541
370/348
2012/0263118 A1 10/2012 Love et al.
(Continued)

FOREIGN PATENT DOCUMENTS

WO    WO-2017/183926 A1    10/2017

OTHER PUBLICATIONS

Cavalcanti, "Resource Allocation and MIMO for 4G and Beyond," (2014).
(Continued)

*Primary Examiner* — Xavier S Wong
(74) *Attorney, Agent, or Firm* — Womble Bond Dickinson (US) LLP

(57) ABSTRACT

The systems, methods, and techniques described in this disclosure allow different wireless systems that operate in accordance with different Radio Access Technologies (RATs) to coexist within a same frequency domain with minimal (if any) inter-RAT interference. Specifically, the described techniques allocate a respective, mutually-exclusive portion of a plurality of Space-Time-Frequency (STF) resources for use in communicating in accordance with each different RAT. For example, mutually-exclusive portions of spatial domain resources, time domain resources, and/or frequency domain resources may be respectively allocated for exclusive use by different RATs. A centralized, third-party controller (120) may perform the allocations, or the allocations may be cooperatively arrived at between systems supporting different RATs, e.g., in a peer-to-peer manner. STF resource allocations may be static and/or dynamic over time, and STF resources may be uniquely identified by respective resource identifiers.

22 Claims, 5 Drawing Sheets

Related U.S. Application Data

(60) Provisional application No. 62/792,312, filed on Jan. 14, 2019.

(56) References Cited

U.S. PATENT DOCUMENTS

| | | |
|---|---|---|
| 2013/0237231 A1 | 9/2013 | Nagaraja et al. |
| 2013/0343316 A1 | 12/2013 | Pajukoski et al. |
| 2014/0161054 A1* | 6/2014 | Sandberg ............ H04W 72/121 370/329 |
| 2014/0307702 A1* | 10/2014 | Mese .................. H04B 7/0691 370/329 |
| 2014/0348260 A1 | 11/2014 | Lorca Hernando |
| 2015/0117360 A1 | 4/2015 | Shen et al. |
| 2015/0373554 A1 | 12/2015 | Freda et al. |
| 2017/0127217 A1* | 5/2017 | Miao .................... H04W 76/15 |
| 2017/0135071 A1 | 5/2017 | Sundberg et al. |
| 2017/0332357 A1 | 11/2017 | Xu et al. |
| 2018/0310283 A1 | 10/2018 | Deenoo et al. |
| 2019/0208530 A1 | 7/2019 | Gao et al. |
| 2019/0289502 A1 | 9/2019 | Abedini et al. |

OTHER PUBLICATIONS

First Examination Report for India Application No. 202147029559, dated Mar. 25, 2022.
International Search Report and Written Opinion for Application No. PCT/US2020/013134, dated Apr. 22, 2020.
Sagari et al., "Coordinated Dynamic Spectrum Management of LTE-U and Wi-Fi Networks," (2015).

* cited by examiner

RESOURCE ALLOCATION ACROSS COEXISTING RADIO ACCESS TECHNOLOGIES

CROSS-REFERENCE TO RELATED APPLICATIONS

This patent application is a continuation of U.S. application Ser. No. 17/413,494 filed Jun. 11, 2021 which is a national stage application, filed under 35 U.S.C. § 371, of International Application No. PCT/US2020/013134, filed Jan. 10, 2020 and entitled "Resource Allocation Across Coexisting Radio Access Technologies," which claims priority to and the benefit of U.S. Provisional Patent Application No. 62/792,312, filed Jan. 14, 2019 and entitled "Resource Allocation Across Coexisting Radio Access Technologies," the disclosures of which are incorporated by reference herein in their entireties.

FIELD OF THE DISCLOSURE

This disclosure relates to co-existence of different types of wireless communication systems operating in a common frequency domain.

BACKGROUND

Wireless communication systems that operate in accordance with different Radio Access Technologies (RATs) may occupy the same frequency, time, and spatial domains, which may cause serious inter-RAT Radio Frequency interference. For example, wireless systems that support the fifth generation of cellular mobile communications Radio Access Technology (referred to as "5G" or "5G RAT") and wireless systems that support the anticipated sixth generation of cellular mobile communications RAT (referred to as "6G" or "6G RAT") may coexist within the 3.5 GHz or mmWave band, where 5G and 6G base station coverage areas may overlap and/or 5G and 6G radios may be co-located within a same base station, thereby greatly increasing the chances and occurrences of inter-RAT interference.

SUMMARY

The systems, methods, and techniques described in this disclosure allow different wireless systems that operate in accordance with different Radio Access Technologies (RATs) to coexist within a same frequency domain with minimal (if any) inter-RAT interference. Generally speaking, the described systems, methods, and techniques allocate, for each different RAT, a respective, mutually-exclusive portion of a plurality of Space-Time-Frequency (STF) resources for use in communicating in accordance with the corresponding RAT. For example, processing hardware allocates a first subset of the plurality of STF resources for communicating in accordance with a first RAT, and the processing hardware allocates a second subset of the plurality of STF resources for communicating in accordance with a second RAT. The processing hardware provides at least one of an indication of the allocated first subset of STF resources or an indication of the allocated second subset of STF resources to at least one of a first controller associated with the first RAT or a second controller associated with the second RAT.

In an example embodiment, the plurality of STF resources includes a plurality of spatial domain resources, where each spatial domain resource has a respective spatial radiation pattern. In this embodiment, different, mutually-exclusive portions of the plurality of spatial domain resources are allocated based on the respective spatial radiation patterns of the plurality of spatial domain resources, so that the respective radiation patterns of the first subset of spatial domain resources associated with the first RAT do not overlap with the respective spatial radiation patterns of the second set the set of spatial domain resources associated with the second RAT. For example, a first subset of the plurality of spatial domain resources is allocated for use in forming one or radio frequency (RF) signals in accordance with the first RAT, a second subset of the plurality of spatial domain resources is allocated for use in forming one or more RF signals in accordance with the second RAT, the spatial radiation patterns of the first subset of spatial domain resources do not overlap with the spatial radiation patterns of the second subset of spatial domain resources.

In an example embodiment, the plurality of STF resources includes a plurality of time domain resources. A first subset of the plurality of time domain resources is allocated for use in forming one or radio frequency (RF) signals in accordance with a first RAT, and a second subset of the plurality of time domain resources is allocated for use in forming one or more RF signals in accordance with a second RAT. The first subset of time domain resources and the second subset of time domain resources are mutually-exclusive subsets of the plurality of time domain resources.

Another example embodiment of the described techniques is a non-transitory medium storing instructions. When executed by processing hardware of one or more network infrastructure elements of one or more wireless systems, the instructions cause one or more network infrastructure elements of one or more wireless systems to allocate, for each different RAT, a respective, mutually-exclusive portion of a plurality of Space-Time-Frequency (STF) resources for use in communicating in accordance with the corresponding RAT, e.g., for use in forming respective RF signals in accordance with the corresponding RAT. The instructions further cause the one or more network infrastructure elements to provide one or more respective indications of one or more allocated subsets of STF resources to one or more controllers of the one or more wireless systems, where each of the one or more controllers corresponds to a different RAT.

DETAILED DESCRIPTION OF THE DRAWINGS

Figure 1:
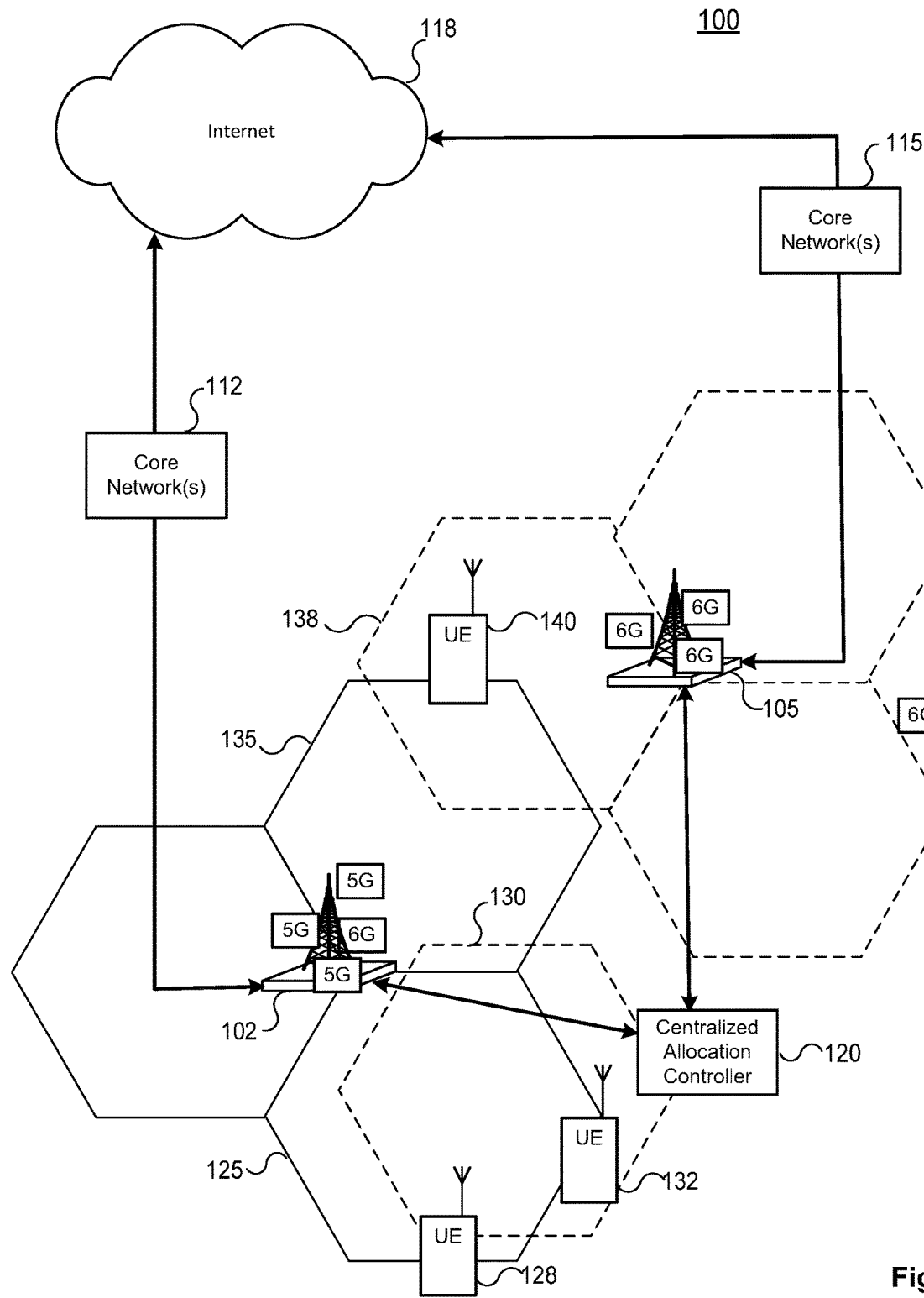
FIG. 1 illustrates an example wireless environment in which one or more wireless systems operate in accordance with at least two different RATs.

Generally speaking, the systems, method, and techniques described in this disclosure allow different wireless systems operating in accordance with different Radio Access Technologies (RATs) to coexist within a same frequency domain or spectrum with negligible (if any) inter-RAT interference by allocating mutually-exclusive portions of spatial or time domain resources, within the same shared frequency domain, for communications that are exclusively in accordance with the RATs to which the portions were allocated. By applying the described techniques, wireless systems that operate in accordance with the standardized 5G RAT and wireless systems that operate in accordance with the anticipated, next generation 6G RAT may simultaneously coexist or operate with little coexistence interference within the 3.5 GHz or mmWave bands, even when coverage areas of the 5G and 6G wireless systems overlap.

For ease of discussion, the different wireless systems that operate in accordance with different RATs within the same frequency domain are referred to in an exemplary (and not limiting) manner as a 5G wireless system and a 6G wireless system. However, one skilled in the art may easily apply the described techniques to other wireless communication systems that operate in accordance with other RATs operable within the same frequency domain. One skilled in the art may also recognize that the described techniques are not limited to wireless systems operating in accordance with only two different RATs. That is, the techniques may be applied to wireless systems operating in accordance with three, four, or more types of different RATs that are operable within the same frequency domain. For further ease of discussion, the terms "5G" and "6G" may be utilized as adjectives to indicate the particular type of RAT with which an object noun operates in accordance (e.g., "5G wireless system," "5G radio," "6G wireless system," "6G radio," etc.).

To enable operational coexistence within a frequency domain, an allocation subsystem may administrate the allocations of respective, mutually-exclusive portions of spatial or time domain resources for use in forming, delivering, and/or receiving communications in accordance with each of the different RATs. In some embodiments, the allocation subsystem is a centralized allocation controller that administrates the spatial and/or time domain resource allocations amongst various base stations that support different types of RATs, and amongst various infrastructure elements that are disposed at a same base station and that support different RATs. In some embodiments, the allocation subsystem is implemented among multiple wireless systems and/or infrastructure elements supporting different RATs to cooperatively administrate the spatial and/or time domain resource allocations. For example, two base stations of two different types of wireless systems may cooperatively administer spatial and/or time domain resource allocations, e.g., in a peer-to-peer manner.

Further, the spatial and/or time domain resource allocations may be static and/or dynamic allocations. For example, when 6G Radio Access Technology initially appears In particular, the allocation subsystem may statically allocate (e.g., reserve) a larger portion of the spatial or time domain resources for the exclusive use of 5G wireless systems, and may statically allocate or reserve a smaller portion of the spatial or time domain resources for the exclusive use of 6G wireless systems. Such initial allocations may remain static over some period of time. As the penetration of 6G technology increases, the allocation subsystem may update the sizes of the statically allocated portions (e.g., the portions that are reserved for exclusive use by the different RATs) accordingly.

In another example, spatial and/or time domain resource allocations may be dynamic, e.g., based upon one or more dynamically-occurring conditions that are detected by one or more wireless systems during operations. For example, the allocation subsystem may first allocate a particular resource to the 5G wireless system to communicate with one user device. Subsequently, the allocation subsystem may (re-) allocate the particular resource to the 6G wireless system to communicate with another user device, and then still subsequently may (re-) allocate the particular resource again to the 5G wireless system to communicate with yet another user device, e.g., based on changing traffic needs or demands. Other dynamic conditions which may influence dynamic resource allocations may include, for example, available bandwidth, movements of third-party objects (and/or of target user devices) that result in blockages of radiation patterns and/or interference, and/or other third-party sources of interference.

In a first embodiment, the allocation subsystem may respectively allocate different spatial domain resources that occupy different mutually-exclusive portions of the spatial domain to each of the 5G and 6G wireless systems. Generally speaking, both the 5G and the 6G wireless systems are able to form radio frequency (RF) signals within a particular frequency domain or spectrum. Each RF signal is formed using a respective spatial radiation pattern, e.g., a respective spatial radiation geometry and a respective bandwidth or spatial direction. In this first embodiment, the allocation subsystem allocates the portions of the spatial domain resources so that the spatial radiation patterns of the RF signals formed by the 5G wireless system do not overlap with the spatial radiation patterns of the RF signals formed by the 6G wireless system. (However, the allocated spatial domain resource portions may concurrently share the same time domain resources and/or the same frequency domain resources.) As such, both the 5G and the 6G wireless systems may concurrently or simultaneously utilize the respective allocated portions of the plurality of spatial domain resources to form RF signals to communicate with respective user devices without generating (or greatly minimizing) interference between the two wireless systems.

In this first embodiment, both of the 5G and the 6G wireless systems may indicate or identify each spatial domain resource of the plurality of spatial domain resources by a unique resource identifier that is known to both systems. For example, a centralized allocation controller may perform the allocating, and may provide the appropriate resource identifiers of one or more of the allocated spatial domain resources to the 5G and 6G wireless systems, e.g., by utilizing one or more APIs, or by directly receiving messages from and/or sending messages to the 5G and 6G systems. In another example, the 5G and 6G wireless systems may exchange, communicate, and/or negotiate spatial domain resource allocations by utilizing resource identifiers, e.g., without any intermediary.

In a second embodiment, the allocation subsystem may respectively allocate different time domain resources that occupy different mutually-exclusive portions of the time domain to each of the 5G and 6G wireless systems. For example, the allocation subsystem may respectively allocate different time slots or time-frequency slots to each of the 5G and 6G wireless systems for use in forming RF signals to communicate with respective user devices. In this manner, while the 5G and the 6G wireless systems may simultaneously or concurrently transmit communications by utilizing same or overlapping spatial radiation patterns, such patterns are mutually distinguished in the time domain and/or in the time-frequency domains between the wireless systems, thereby avoiding or minimizing inter-RAT interference.

Similar to the first embodiment, in this second embodiment, time domain resource allocation may be performed by a centralized allocation controller or in a peer-to-peer manner. For example, a centralized controller may indicate at least some portion of the respective time or time-frequency slots that are allocated to each of the 5G and 6G wireless systems. Additionally or alternatively, the 5G and 6G systems may communicate and/or negotiate, in a peer-to-peer manner, at least some portion of the respective time or time-frequency slots that each system plans to utilize, e.g., for uplink/downlink transmissions, and/or based on slot configuration (e.g., orthogonal slot configuration). In an example implementation, a 5G (or earlier generation or version) wireless system may send its SSB (Synchronization Signal Block) configuration to the 6G (or later generation or version) system. The 6G wireless system may then avoid transmitting on the slots indicated by the SSB configuration of the 5G system, for example, by avoiding or skipping transmissions on the slots indicated by the 5G system, and/or by rate matching its 6G Uplink (UL) and/or (Downlink) DL channel based on the resources indicated by the 5G system.

FIG. 1 illustrates an example wireless environment 100 that includes one or more wireless systems operating in accordance with at least two different Radio Access Technologies (RATs), each of which is operable within a same or common frequency domain or spectrum, e.g., 3.5 GHz frequency band, mmWave band, or some other suitable frequency band or domain. Generally speaking, one or more infrastructure elements of the one or more wireless systems allocate mutually-exclusive portions of spatial and/or time domain resources, within the same shared frequency domain, for use in respectively communicating in accordance with each of the different RATs. As illustrated in example wireless environment 100, one of the wireless systems operates in accordance with the 5G cellular communications standard, and the other one of the wireless systems operates in accordance with the 6G cellular communications standard. In particular, as shown in FIG. 1, a first base station 102 includes both 5G and 6G radios mounted thereon and as such includes a portion of the 5G wireless system and a portion of the 6G wireless system. A second base station 105 includes 6G radios mounted thereon and as such includes a portion of the 6G wireless system. Accordingly, within the wireless environment 100, some individual base stations, such as the base station 105, may support only one RAT. Other individual base stations, such as the base station 102, may support more than one RAT.

As previously discussed, although FIG. 1 illustrates the different wireless systems within the wireless environment 100 as being 5G and 6G wireless systems, it is understood that the wireless environment 100 may include additional or alternate wireless systems that operate in accordance with other RATs associated with the same shared frequency domain. In an example, a first wireless system within the wireless environment 100 operates in accordance with an earlier version or generation of a wireless standard, while a second wireless system within the wireless environment 100 operates in accordance with a later version or generation of the wireless standard. In another example, a first wireless system included in the wireless environment 100 operates in accordance with a cellular communications standard (e.g., 4G, 4G LTE, 5G NR, 6G, etc.), and a second wireless system included within the wireless environment 100 operates in accordance with a wireless networking standard (e.g., IEEE 802.11-compatible wireless standard, IEEE 802.16-compatible wireless standard, etc.). Of course, other combinations of wireless systems that utilize different RATs may be included in the wireless environment 100, and may operate in accordance with any of the described systems, methods, and/or techniques to support inter-RAT coexistence within a same frequency domain.

Further, note that the described systems, method, and techniques do not require the entire frequency spectrum in which a first wireless system of the environment 100 operates and the entire frequency spectrum in which a second wireless system of the environment 100 operates to overlap. That is, the entire frequency spectrums of the different wireless systems within the wireless environment 100 are not required to fully or entirely overlap. Indeed, although the described systems, method, and techniques may be applied in such an arrangement of the wireless environment 100, in other arrangements of the wireless environment 100, only a portion of the entire frequency spectrum in which the first wireless system operates overlaps with only a portion of the entire frequency spectrum in which the second wireless system operates.

As shown in FIG. 1, each of the base stations 102, 105 of the wireless environment 100 respectively links to one or more core networks 112, 115 which, in turn, communicatively connect to the Internet 118. In the embodiment shown in FIG. 1, each base station 102, 105 also communicatively connects to a centralized allocation controller 120. In other embodiments, such as those in which the base stations 102, 105 cooperate to allocate spatial or time domain resources without utilizing any intermediary, the centralized allocation controller 120 may be omitted or not utilized, and the base stations 102, 105 may communicate in a peer-to-peer manner, e.g., via a local communications link (not shown in FIG. 1).

In the example wireless environment 100, the base station 102 covers a 5G cell 125 in which UE 128 is currently located. The UE 128 is configured to exchange messages with the base station 102 using 5G Radio Access Technology, e.g., 5G NR. Further, the base station 102 also covers a 6G cell 130 in which UE 132 is currently located, and the coverage of the 6G cell 130 overlaps, at least partially, with the coverage of the 5G cell 125. Still further, the base station 102 covers an additional 5G cell 135 whose coverage at least partially overlaps with the coverage of a 6G cell 138 that is covered by the base station 105 and in which UE 140 is currently located. Each of UE 132 and UE 140 can wirelessly communicate using the 6G Radio Access Technology.

Although not illustrated in FIG. 1, each UE 128, 132, 140 has respective processing hardware that can include one or more general-purpose processors (e.g., CPUs) and a non-transitory computer-readable memory storing instructions that the one or more general-purpose processors execute. Additionally or alternatively, the respective processing hardware of each UE 128, 132, 140 may include special-purpose processing units such as one or more respective wireless communication chipsets and one or more respective radio resource controllers (RRCs), for example, that are particularly configured to support communications of the respective UE 128, 132, 140 in accordance with one or more RATs. Each of the RRC controllers of UEs 128, 132, 140 may be implemented using any suitable combination of hardware, software, and firmware. In one example implementation, the RRC controller is a set of instructions that define a component of the operating system of its respective UE 128, 132, 140, and one or more respective CPUs execute these instructions to perform RRC functions. In another example implementation, the RRC controller is implemented using firmware that is as a part of a wireless communication chipset. In some implementations, a UE 128, 132, 140 that is able to communicate via more than one different RAT may include a specific wireless communication chipset and a specific RRC corresponding to each different RAT, or the UE 128, 132, 140 may include a single wireless communication chipset and a single RRC that are configured to support more than one different RATs.

Figure 2:
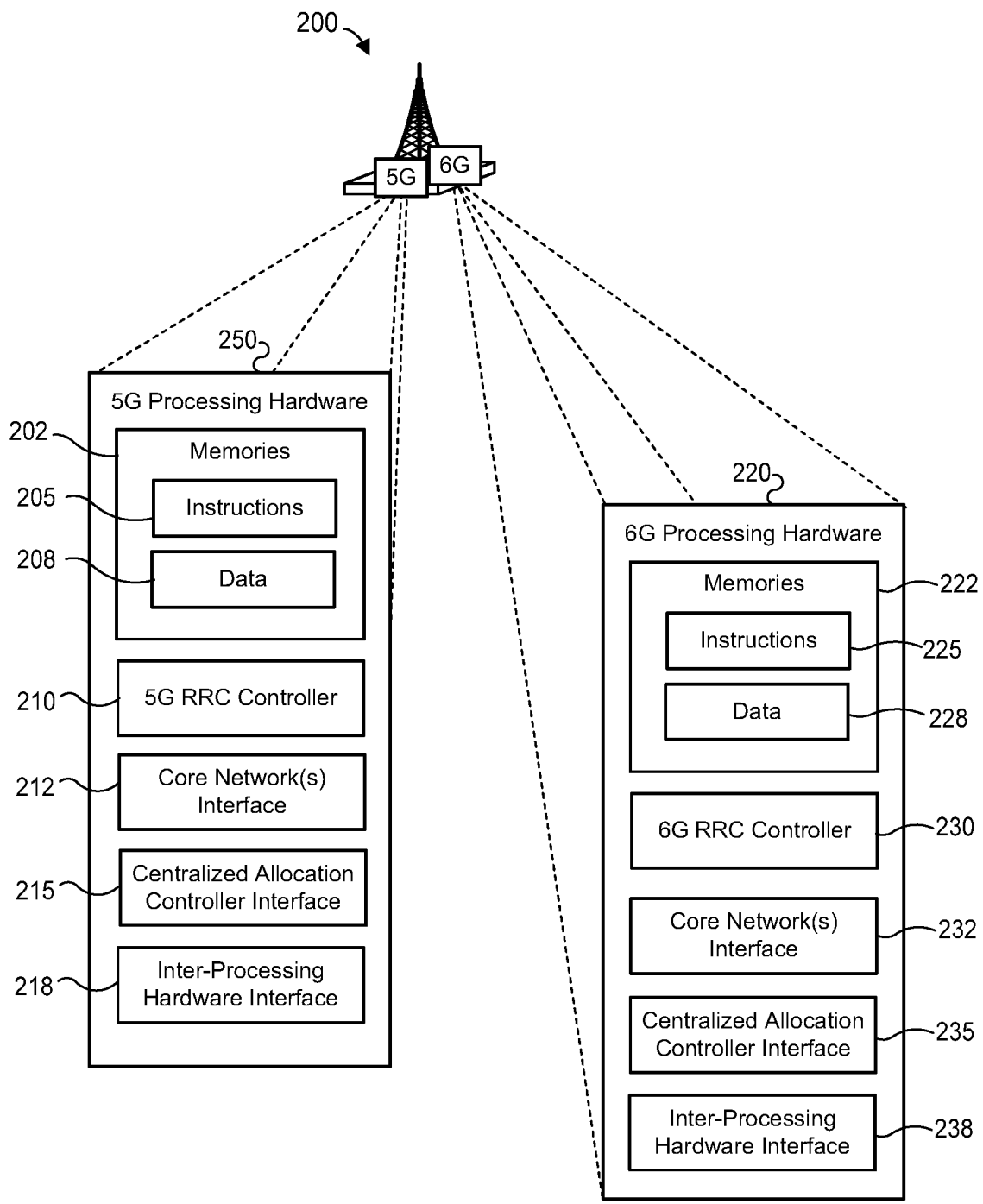
FIG. 2 is a block diagram of an example base station depicted in FIG. 1.

FIG. 2 is a block diagram of an embodiment 200 of the base station 102 of FIG. 1. For ease of discussion (and not limitation purposes), FIG. 2 is described in conjunction with elements shown in FIG. 1. For example, as FIG. 1 illustrates the base station 102 as including both 5G and 6G radios mounted thereon, the embodiment 200 of the base station 102 illustrated in FIG. 2 includes both 5G processing hardware 250 to support the 5G radios and 6G processing hardware 220 to support the 6G radios.

As shown in FIG. 2, the example 5G processing hardware 250 includes one or more tangible, non-transitory computer-readable memories 202 storing computer-executable instructions 205. In an implementation, the computer-executable instructions 205 are executable by one or more processors to perform any one or more of the portions of the described methods or techniques, and data 208 that is utilized to perform any one or more of the portions of the described methods or techniques is stored at the memories 202. In some implementations, one or more processors execute the computer-executable instructions 205 to operate in conjunction with firmware and/or other portions of the 5G processing hardware 250 to perform any one or more of the portions of the described methods or techniques.

Additionally, the example 5G processing hardware 250 includes a 5G Radio Resource controller 210 which is used to communicate RF signals via the 5G radios with user devices in accordance with the 5G RAT, and a core network interface 212 which is used to communicate digital signals to/from the one or more respective core networks 112. In some embodiments, the 5G processing hardware 250 includes an interface 215 that communicatively connects the 5G processing hardware 250 to the centralized allocation controller 120; however, in some embodiments, the centralized allocation controller interface 215 is omitted or is not utilized by the 5G processing hardware 250.

Further, in some embodiments, the 5G processing hardware 250 includes an interface 218 via which the 5G processing hardware may directly communicate (e.g., communicate without utilizing an intermediate node or other communications intermediary) with 6G processing hardware 220. The 6G processing hardware 220 may be disposed at the base station 102 as illustrated in FIG. 2, and/or the 6G processing hardware 220 may be disposed at other base stations within the wireless environment 100. In some embodiments, the inter-processing hardware interface 218 is omitted or is not utilized by the 5G processing hardware 250.

The 6G processing hardware 220 includes, for example, one or more tangible, non-transitory computer-readable memories 222 storing computer-executable instructions 225. In an implementation, one or more processors execute the computer-executable instructions 225 to perform any one or more of the portions of the described methods or techniques, and data 228 that is utilized to perform any one or more of the portions of the described methods or techniques is stored at the memories 222. In some implementations, one or more processors execute the computer-executable instructions 225 to operate in conjunction with firmware and/or other portions of the 6G processing hardware 220 to perform any one or more of the portions of the described methods or techniques.

Additionally, the 6G processing hardware 220 includes a 6G Radio Resource controller 230 which is used to communicate RF signals via the 6G radios with user devices in accordance with the 6G RAT. The 6G processing hardware 220 also includes a core network interface 232 which is used to communicate digital signals to/from the one or more respective core networks 112. In some embodiments, the 6G processing hardware 220 includes an interface 235 that is communicatively connects the 6G processing hardware 220 to the centralized allocation controller 120; however, in some embodiments, the centralized allocation controller interface 235 is omitted or is not utilized by the 6G processing hardware 220.

In some embodiments, the 6G processing hardware 220 includes an interface 238 via which the 6G processing hardware may directly communicate (e.g., communicate without utilizing an intermediate node or other communications intermediary) with 5G processing hardware 250. The 5G processing hardware 250 may be disposed at the base station 102 as illustrated in FIG. 2, and/or the 5G processing hardware 250 may be disposed at other base stations within the wireless environment 100. In some embodiments, the inter-processing hardware interface 238 is omitted or is not utilized by the 6G processing hardware 220.

Note that other base stations within the wireless environment 100 may include respective instances of the 5G processing hardware 250 to support communications in accordance with the 5G RAT. Additionally or alternatively, other base stations within the wireless environment 100 may include respective instances of the 6G processing hardware 220 to support communications in accordance with the 6G RAT.

The one or more wireless systems uses a plurality of Space-Time-Frequency (STF) resources for transmitting and receiving communications to/from user devices in accordance with the 5G RAT and in accordance with the 6G RAT. A "Space-Time-Frequency resource" or "STF resource," refers to a resource via which information or data may be delivered wirelessly using radio frequency (RF) signals between wireless communication systems and user devices. For example, a base station of a wireless system may utilize a first subset of the plurality of STF resources to deliver information or data to a first user device and may utilize a second subset of the plurality of STF resources to deliver information or data to a second user device. Each STF resource includes or is associated with a particular resource of a spatial domain, a particular resource of a time domain, and a particular resource of a frequency, and RF signals may be formed therefrom. A spatial domain resource may be a particular radiation pattern that has a respective shape or spatial geometry, and optionally may have a particular spatial radiation direction. For example, a beam formed by a base station may have both a respective spatial geometry and a particular radiation direction, whereas an omnidirectional radiation pattern formed by the base station may have a respective spatial geometry without being associated with only a single, particular radiation direction. A time domain resource may be, for example, a time slot within the time domain, and a frequency domain resource may be, for example, a frequency slot within the frequency spectrum of the frequency domain. Generally speaking, each RAT operates in accordance with a respective wireless standard that defines the assigning, allocation, contention-handling, and interference mitigation techniques of usable STF resources within each RAT, e.g., on an intra-RAT basis.

As previously discussed, the plurality of RATs may share or utilize a common frequency domain or spectrum. For example, at least a portion of the frequency spectrum utilized for communications in accordance with the first RAT and at least a portion of the second frequency spectrum utilized for communications in accordance with the second RAT may overlap. Due at least in part to the overlapping frequency spectrum, significant inter-RAT interference may occur when transmissions in accordance with the first RAT and transmissions in accordance with the second RAT are concurrently delivered.

Figure 3:
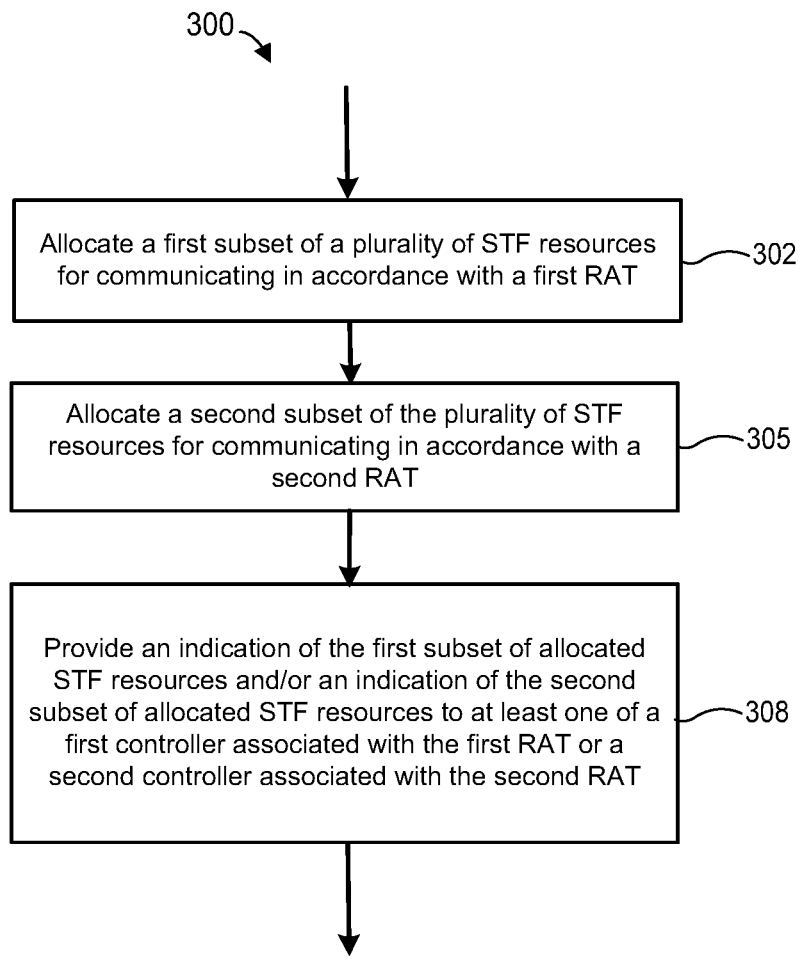
FIG. 3 is a flow chart of an example method of utilizing Space-Time-Frequency resources to support coexistence of wireless systems, which can be implemented in the system of FIG. 1.

FIG. 3 is a flow chart of an example method 300 of utilizing Space-Time-Frequency resources to support coexistence of wireless systems with little or no inter-RAT interference. At least a portion of the method 300 may be performed by one or more wireless systems of the wireless environment 100 of FIG. 1. Additionally or alternatively, at least a portion of the method 300 may be performed by one or more other wireless systems. In embodiments, the method 300 may include additional, less, or alternate functionality than that discussed with respect to FIG. 3, including that discussed elsewhere in this document.

At block 302, the method 300 may include allocating, by processing hardware, a first subset of the plurality of STF resources for communicating in accordance with a first RAT of the plurality of RATs. At block 305, the method 300 may include allocating, by the processing hardware, a second subset of the plurality of STF resources for communicating in accordance with the second RAT of the plurality of RATs. Each RAT included in the plurality of RATs may be able to utilize any of the plurality of STF resources for their respective communications, and the plurality of RATs share or are operable within a same frequency domain or spectrum. Further, the first subset of STF resources and the second subset of STF resources are mutually-exclusive subsets.

At block 308, the method 300 may include providing, by the processing hardware, a first indication of the allocated first subset of STF resources and/or a second indication of the allocated second subset of STF resources to a first controller associated with the first RAT and/or to a second controller associated with the second RAT. Based on the provided indication(s), the first controller associated with the first RAT may cause wireless transmissions of the first RAT to be delivered to a first user device using the allocated first subset of STF resources, and the second controller associated with the second RAT may cause wireless transmissions of the second RAT to be delivered to a second user device using the allocated second subset of STF resources. Accordingly, the method 300 may cause, within the wireless environment 100, concurrent delivery of (i) first data between one or more radios that operate in accordance with the first RAT and the first user device via a first one or more radio frequency signals formed using the allocated first subset of STF resources, and (ii) second data between one or more radios that operate in accordance with the second RAT and the second user device via a second one or more radio frequency signals formed using the allocated second subset of STF resources, e.g., with minimal or no resulting inter-RAT interference.

In some arrangements, the first controller associated with the first RAT and the second controller associated with the second RAT are disposed within a same base station, such as the base station 102 shown in FIG. 1. For example, the first controller may be one of the 5G RRC Controller 210 or the 6G RRC Controller 230 disposed at the base station 200 of FIG. 2, and the second controller may be the other one of the 5G RRC Controller 210 or the 6G RRC Controller 230. In another example (not shown), the first controller and the second controller may be included in a unitary, integral controller disposed at the base station 200, or at least one of the first controller or the second controller may be a respective controller other than the 5G RRC Controller 210 and the 6G RRC Controller 230 that is disposed at the base station 200. At any rate, in these arrangements, the same base station is a single base station that includes both wireless network infrastructure elements for transmitting and receiving information/data in accordance with the first RAT and for transmitting and receiving information/data in accordance with the second RAT. In other arrangements, the first controller and the second controller are respectively disposed within different base stations. For example, the first controller may be disposed within base station 102 of FIG. 1 while the second controller may be disposed within base station 105 of FIG. 1.

In an embodiment, the allocating of the first subset of STF resources (block 302) and the allocating of the second subset of STF resources (block 305) are performed by a centralized allocation controller, such as the centralized allocation controller 120 of FIG. 1. The centralized allocation controller 120 is communicatively connected to both the first controller and the second controller, e.g., via respective data links which typically, but not necessarily, include one or more wired data links. The centralized allocation controller may include one or more processors and one or more tangible, non-transitory memories storing instructions thereon that, when executed by the one or more processors, cause the centralized allocation controller to determine the mutually-exclusive first subset and second subset of STF resources based on various criteria, e.g., such as is discussed in more detail elsewhere within the present disclosure. In this embodiment, the centralized allocation controller provides an indication of the first subset of allocated STF resources to the first controller and/or to the second controller (block 308). Additionally or alternatively, the centralized allocation controller provides an indication of the second subset of allocated STF resources to the first controller and/or to the second controller (block 308). The providing of the indication(s) of the allocated subset(s) of STF resources to the first controller and/or to the second controller (block 308) may utilize any suitable technique such as, for example, one or more Application Program Interfaces (APIs), transmission of messages and/or data, and the like.

In another embodiment, the allocating of the first subset of STF resources (block 302) and the allocating of the second subset of STF resources (block 305) are cooperatively performed by one or more 5G network infrastructure elements in conjunction with one or more 6G network infrastructure elements. For example, referring to FIG. 2, one or more elements of 5G processing hardware 250 (e.g., the instructions 205, the 5G RRC controller 210, another controller included in the 5G processing hardware 250 (not shown), and/or the inter-base station interface 218) and one or more elements of 6G processing hardware processing hardware 220 (e.g., the instructions 225, the 6G RRC controller 230, another controller included in the 6G processing hardware 220 (not shown), and/or the inter-base station interface 238) cooperatively determine or negotiate the allocation of the first subset of STF resources (block 302) and/or cooperatively determine or negotiate the allocation of the second subset of STF resources (block 305), e.g. based on various criteria, such as is discussed in more detail elsewhere within the present disclosure. In this embodiment, the one or more 5G network infrastructure elements and the one or more 6G network infrastructure elements may logically communicate in a direct, peer-to-peer manner, e.g., via the inter-base station interfaces 218, 238 without any intervening processor or intermediary such as the centralized allocation controller 120 or other controller.

In an embodiment, the allocation of the first subset of STF resources (block 302) and the allocating of the second set of STF resources (block 305) include static allocations, e.g., allocations that are relatively static and do not change over some period of time. The static allocations may reserve respective, mutually exclusive portions of the plurality of STF resources for use for communications in accordance with only one corresponding RAT over the period of time. Although such allocations may remain static over the period of time, at some point the static allocations be changed, e.g., via a configuration update, a user instruction, etc., so that different, mutually-exclusive portions of the plurality of STF resources are reserved for communications in accordance with only one same or different corresponding RAT. Indications of the respective, static allocations may be (re-)configured into the processing hardware 250, 220 and/or stored within the data 220, 228 of the processing hardware 250, 220, for instance.

In an embodiment, the allocation of the first subset of STF resources (block 302) and the allocation of the second set of STF resources (block 305) include dynamic allocations that may change based upon dynamic conditions that are detected within the wireless environment 100. An occurrence of a dynamic condition may be detected by one or more network infrastructure elements of the one or more wireless systems included in the wireless environment 100 during operations, for example. Examples of dynamic conditions include a traffic demand corresponding to the first RAT, a traffic demand corresponding to the second RAT, a traffic shaping corresponding to the first RAT, a traffic shaping corresponding to the second RAT, a bandwidth requirement and/or usage corresponding to the first RAT, a bandwidth requirement and/or usage corresponding to the second RAT, and/or other dynamic conditions corresponding to the first RAT and/or to the second RAT. The execution of the method 300 (and therefore the allocating of the first subset of STF resources (block 302) and the allocating of the second set of STF resources (block 305)) may be triggered based upon the detection of a single dynamic condition, or may be triggered based upon the detection of more than one dynamic condition in combination. With dynamic allocation, a pool of STF resources may be allocated, for example, to a particular RAT with the greatest detected and/or anticipated need, and the allocations may dynamically change in accordance with changing conditions within the wireless environment 100.

In some implementations, the allocating of the first subset of STF resources (block 302) and allocating of the second set of STF resources (block 305) includes a hybrid of static and dynamic allocations. For example, a first subset of the plurality of STF resources may be statically reserved for exclusive use for communications in accordance with the first RAT, and/or a second subset of the plurality of STF resources may be statically reserved for exclusive use for communications in accordance with the second RAT. A third subset of STF resources may be the dynamically allocated pool of STF resources that may be used for communications in accordance with either the first RAT or the second RAT, e.g., based on the occurrence of dynamic conditions within the wireless environment 100. The first, second, and third subset of STF resources may be mutually exclusive subsets of the plurality of STF resources.

In an embodiment, the request or demand of a requesting entity initiates an execution of the method 300. The requesting entity may be, for example, the first controller, the second controller, or another controller that is communicatively connected to both the first controller and the second controller, for instance, the centralized allocation controller 120.

As discussed above, the disclosed systems, methods, and/or techniques that enable the coexistence of a plurality of RATs that share or utilize the same frequency spectrum within the wireless environment 100 include allocating mutually-exclusive portions of spatial domain resources and/or time domain resources, within the same shared frequency domain, for communications that are exclusively in accordance with the RATs to which the portions were allocated. In some embodiments, the disclosed systems, methods, and/or techniques that enable the coexistence of the plurality of RATs include allocating mutually-exclusive portions of frequency domain resources for communications that are exclusively in accordance with the RATs to which the portions were allocated. For example, a first portion of the shared frequency spectrum (e.g., one or more frequency slots) may be allocated for exclusive use for communications in accordance with a first RAT, while a second, mutually-exclusive portion of the shared frequency spectrum (e.g., one or more other frequency slots) may be allocated for exclusive use for communications in accordance with a second RAT, e.g., by using one or more of the techniques discussed above for spatial domain resource allocation and/or for time domain resource allocation. Indeed, in some embodiments, frequency domain resource allocation may be combined with spatial domain resource allocation and/or with time domain resource allocation to enable multi-RAT co-existence with the wireless environment 100. For example, a first subset of time-frequency slots of a plurality of time-frequency slots that are usable for communications in accordance with both the first RAT and the second RAT may be allocated for use in communicating accordance with the first RAT, and a second, mutually exclusive subset of time-frequency slots of the plurality of time-frequency slots may be allocated for use in communicating in accordance with the second RAT. The first subset of time-frequency slots and the second subset of time-frequency slots may be orthogonal subsets, for example.

Figure 4:
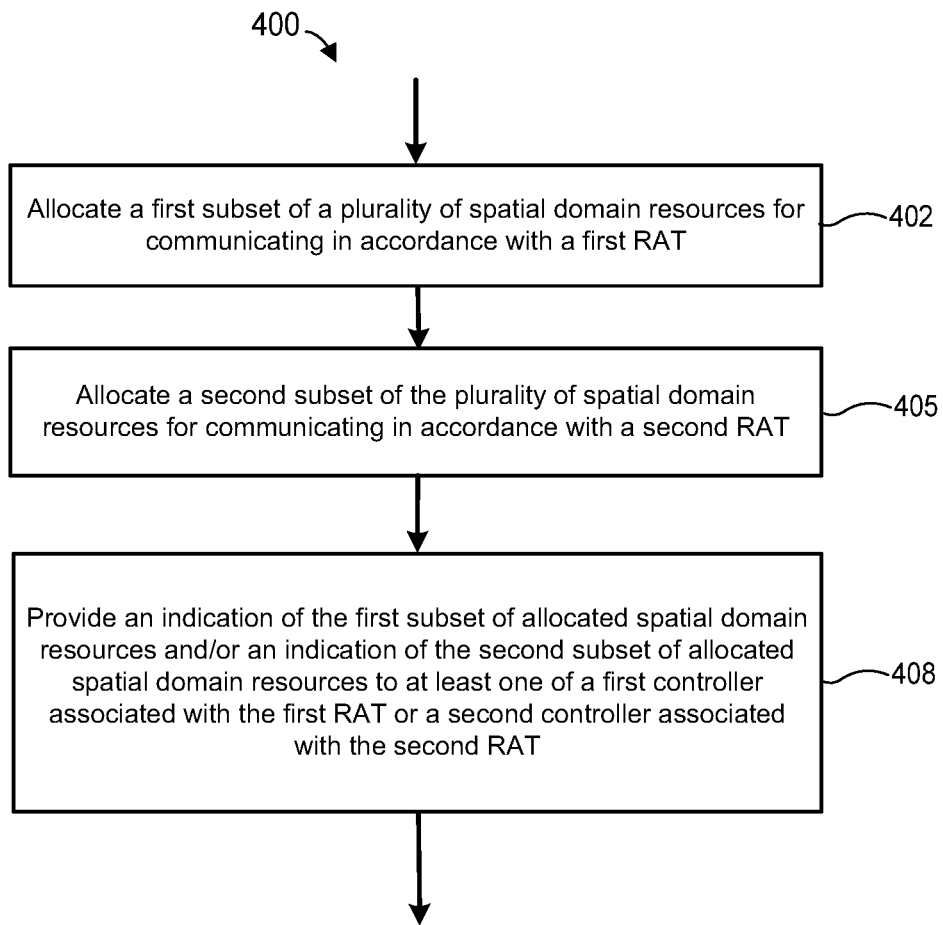
FIG. 4 is a flow chart of an example method of utilizing spatial domain resources to support coexistence of wireless systems, which can be implemented in the system of FIG. 1.

FIG. 4 is a flow chart of an embodiment 400 of the method 300. The method 400 utilizes spatial domain resources to support the coexistence of wireless systems with negligible or no inter-RAT interference. At least a portion of the method 400 may be performed by one or more wireless systems of the wireless environment 100 of FIG. 1, and/or at least a portion of the method 400 may be performed by one or more other wireless systems. In embodiments, the method 400 may include additional, less, or alternate functionality than that discussed with respect to FIG. 4, including that discussed elsewhere in this document. In embodiments, the method 400 may be performed in conjunction with one or more other embodiments of the method 300, such as those discussed elsewhere in this document.

As shown in FIG. 4, the method 400 includes allocating; by processing hardware, a first subset of a plurality of spatial domain resources for communicating in accordance with a first RAT (block 402), and allocating, by the processing hardware, a second subset of the plurality of spatial domain resources for communicating in accordance with the second RAT (block 405), where the first subset and the second subset of spatial domain resources are mutually exclusive subsets of the plurality of spatial domain resources. Each spatial domain resource of the plurality of spatial domain resources has a respective spatial radiation pattern, and each respective radiation pattern has a respective spatial geometry and optionally has a respective spatial direction. For example, a first spatial domain resource may be a first beam of a particular radiation pattern in a first direction, a second spatial domain resource may be a second beam of the particular radiation pattern in a second direction, and a third spatial domain resource may be an omnidirectional radiation pattern, each of which is formable, by one or more base stations, in accordance with any of the plurality of RATs. In the method 400, the first subset of spatial domain resources and the second subset of spatial the main resources are allocated (blocks 402, 405) so that the respective spatial radiation patterns of the spatial domain resources of the first subset do not overlap with the respective spatial radiation patterns of the spatial domain resources of the second subset.

At a block 408, the method 400 may include providing, by the processing hardware, a first indication of the allocated first subset of spatial domain resources and/or a second indication of the allocated second subset of spatial domain resources to a first controller associated with the first RAT and/or to a second controller associated with the second RAT. Based on the provided indication(s), the first controller associated with the first RAT may cause wireless transmissions of the first RAT to be delivered to a first user device using the allocated first subset of spatial domain resources, and the second controller associated with the second RAT may cause wireless transmissions of the second RAT to be delivered to a second user device using the allocated second subset of spatial domain resources. Accordingly, the method 400 may cause, within the wireless environment 100, concurrent delivery of (i) first data between one or more radios that operate in accordance with the first RAT and the first user device via a first one or more radio frequency signals formed using the allocated first subset of spatial domain resources, and (ii) second data between one or more radios that operate in accordance with the second RAT and the second user device via a second one or more radio frequency signals formed using the allocated second subset of spatial domain resources.

Note that, in some implementations, at least some of the allocated first set of spatial domain resources may overlap within the time domain with at least some of allocated second set of spatial domain resources. That is, at least some of the allocated first set of spatial domain resources may be formed using one or more time domain resources, and at least some of the allocated second set of spatial domain resources may also be concurrently formed using the one or more time domain resources that are utilized in forming the at least some of the allocated first set of spatial domain resources. However, even though at least some time domain resources (and, indeed, at least some frequency domain resources) may be concurrently utilized for forming transmissions in accordance with the first RAT and for forming transmissions in accordance with the second RAT, in this embodiment 400, inter-RAT interference is mitigated because the separate allocations spatially distinguish transmissions in accordance with the first RAT and transmissions in accordance with the second RAT.

In some implementations of the method 400, a respective resource identifier indicates each spatial domain resource of the plurality of spatial domain resources. Communications amongst various network infrastructure elements of the wireless systems within the wireless environment 100 may utilize the respective resource identifiers, e.g., for allocation purposes and/or other purposes. For example, the first controller, the second controller, and/or the centralized allocation controller may refer to various spatial domain resources via their respective resource identifiers, e.g., when indicating and/or negotiating allocations. The respective resource identifiers may be pre-assigned so that the network infrastructure elements have a priori knowledge of the respective resource identifiers. Additionally or alternatively, at least some of the respective resource identifiers may be assigned during allocation (block 402, 405). In an example, at the block 408, providing the first indication of the allocated first subset of spatial domain resources includes providing an indication of the respective resource identifiers of the allocated first subset of spatial domain resources, and providing the second indication of the allocated second subset of spatial domain resources includes providing an indication of the respective resource identifiers of the allocated second subset of spatial domain resources.

Additionally, in some implementations of the method 400, respective indications of respective spatial radiation patterns of the allocated subsets of spatial domain resources are provided in conjunction with the respective resource identifiers of the allocated subsets of spatial domain resources. For example, respective indications of non-overlapping spatial directions may be provided in conjunction with the respective resource identifiers of the allocated subsets of spatial domain resources.

Figure 5:
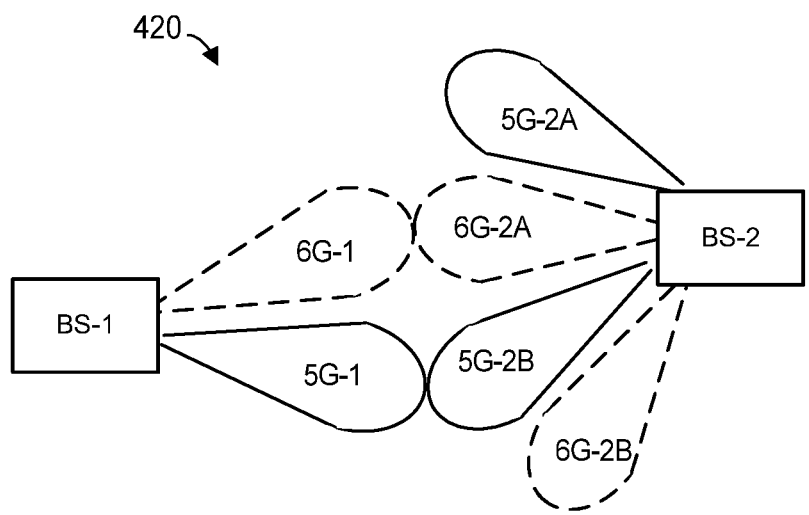
FIG. 5 schematically illustrates an example utilization of spatial domain resources allocated in accordance with the method of FIG. 4.

FIG. 5 illustrates an example utilization 420 of allocations of spatial domain resources resulting from an execution of the method 400 of FIG. 4. In the utilization 420, both Base Station 1 (BS-1) and a Base Station (BS-2) support both 5G RAT (denoted by the solid lines) and 6G RAT (denoted by the dashed lines). Spatial domain resources 5G-1, 5G-2A, and 5G-2B have been allocated at the block 402 for communicating in accordance with 5G RAT, and spatial domain resources 6G-1, 6G-2A, and 6G-2B have been allocated at the block 405 for communicating in accordance with 6G RAT. Based on the provided indication(s) of the allocations of spatial domain resources to BS-1 and/or to BS-2 (block 408), each of the base stations delivers and receives transmissions of each particular RAT via the spatial domain resources that have been allocated thereto. Note that the respective spatial radiation patterns of 5G spatial domain resources do not overlap with any of the respective spatial radiation patterns of 6G spatial domain resources, either within an individual base station (e.g., BS-2) or among base stations (e.g., BS-1 and BS-2).

Figure 6:
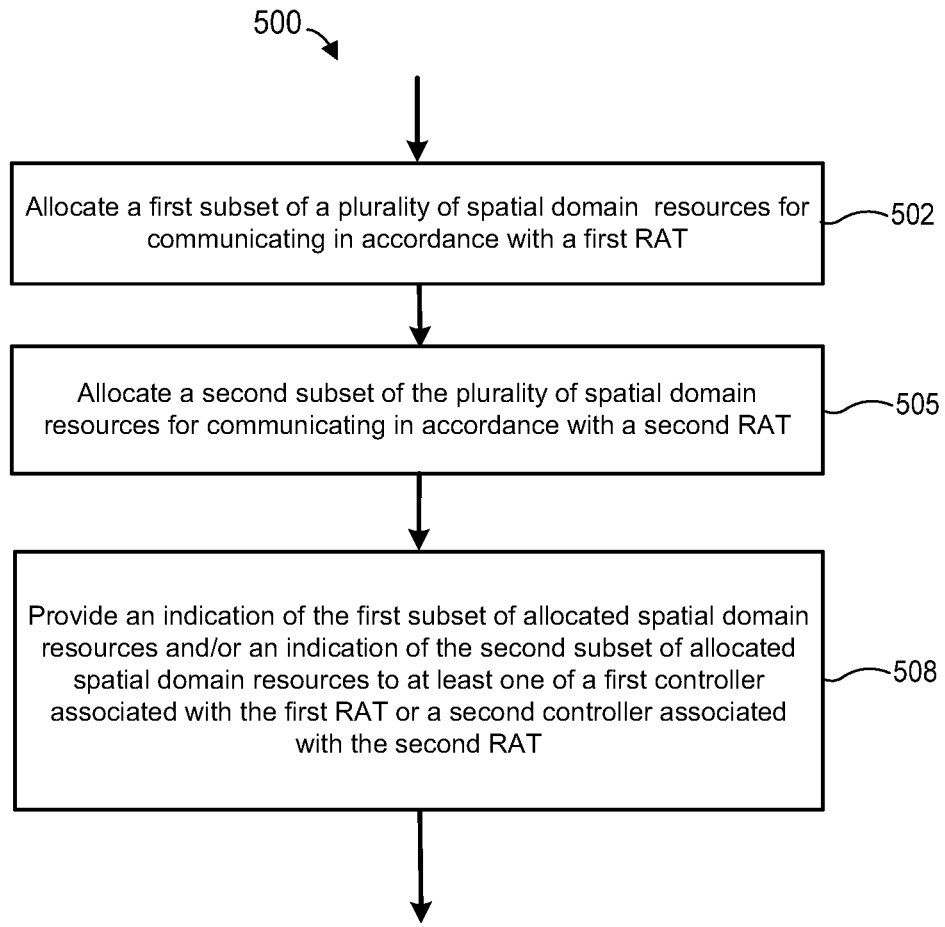
FIG. 6 is a flow chart of an example method of using time domain resources to support coexistence of wireless systems, which can be implemented in the system of FIG. 1.

FIG. 6 is a flow chart of an embodiment 500 of the method 300. The method 500 utilizes time domain resources to support the coexistence of wireless systems with very little or no inter-RAT interference. At least a portion of the method 500 may be performed by one or more wireless systems of the wireless environment 100 of FIG. 1, and/or at least a portion of the method 500 may be performed by one or more other wireless systems. In embodiments, the method 500 may include additional, less, or alternate functionality than that discussed with respect to FIG. 6, including that discussed elsewhere in this document. In embodiments, the method 500 may be performed in conjunction with one or more other embodiments of the method 300, such as those discussed elsewhere.

As shown in FIG. 6, the method 500 includes allocating, by processing hardware, a first subset of a plurality of time domain resources for communicating in accordance with a first RAT (block 502), and allocating, by the processing hardware, a second subset of the plurality of time domain resources for communicating in accordance with the second RAT (block 505), where the first subset and the second subset of time domain resources are mutually-exclusive subsets of the plurality of time domain resources. Each time domain resource of the plurality of time domain resources is a respective timeslot that is usable for communications of 5G RAT and for communications of 6G RAT, for example.

At a block 508, the method 500 may include providing, by the processing hardware, a first indication of the allocated first subset of time domain resources and/or a second indication of the allocated second subset of time domain resources to a first controller associated with the first RAT and/or to a second controller associated with the second RAT. Based on the provided indication(s), the first controller associated with the first RAT may cause wireless transmissions of the first RAT to be delivered to a first user device using the allocated first subset of time domain resources, and the second controller associated with the second RAT may cause wireless transmissions of the second RAT to be delivered to a second user device using the allocated second subset of time domain resources. Accordingly, the method 500 may cause, within the wireless environment 100, concurrent delivery of (i) first data between one or more radios that operate in accordance with the first RAT and the first user device via a first one or more radio frequency signals formed using the allocated first subset of time domain resources, and (ii) second data between one or more radios that operate in accordance with the second RAT and the second user device via a second one or more radio frequency signals formed using the allocated second subset of time domain resources.

Note that, in some implementations, at least some of the allocated first set of time domain resources may overlap within the spatial domain with at least some of allocated second set of time domain resources. That is, at least some of the allocated first set of time domain resources may be formed using one or more spatial domain resources, and at least some of the allocated second set of time domain resources may be concurrently formed using the one or more spatial domain resources that are utilized in forming the at least some of the allocated first set of time domain resources. For example, a particular set of spatial domain resources having a particular radiation pattern and a particular spatial direction may be utilized by a base station to concurrently deliver 5G transmissions and 6G transmissions. However, this embodiment 500 mitigates inter-RAT interference because transmissions in accordance with the first RAT and transmissions in accordance with the second RAT are distinguished temporally within the particular set of spatial domain resources. For example, the aforementioned base station concurrently transmits, over some interval of time and by using the particular set of spatial domain resources, both 5G communications and 6G communications; however, interference between said 5G and 60 communications are mitigated as each type of communication utilizes different allocated time domain resources.

In an embodiment of the method 500, the first controller associated with the first RAT and the second controller associated with the second RAT may cooperatively determine or negotiate, e.g., in a peer-to-peer manner, one or more of the allocations 502, 505. In an example implementation, the first controller communicates, to the second controller, a configuration of a Synchronization Signal Block (SSB) corresponding to the first RAT, thereby indicating the particular time domain resources over which communications in accordance with the first RAT are delivered. In this example implementation, the indicated, particular time domain resources corresponding to the first RAT are considered to be the allocated first subset of time domain resources. In another example limitation, the first controller announces or otherwise transmits, to the second controller, indications of the particular time domain resources over which communications in accordance with the first RAT are delivered, and said indicated, particular time domain resources are considered to be the allocated first subset of time domain resources.

The second controller, upon receiving the indication of the allocated first subset of time domain resources from the first controller, may avoid utilizing the indicated subset of time domain resources for delivering communications in accordance with the second RAT. Additionally or alternatively, the second controller may cause transmissions on an uplink and/or a downlink corresponding to the second RAT to be rate-matched based on the indicated subset of time domain resources corresponding to the first RAT.

Figure 7:
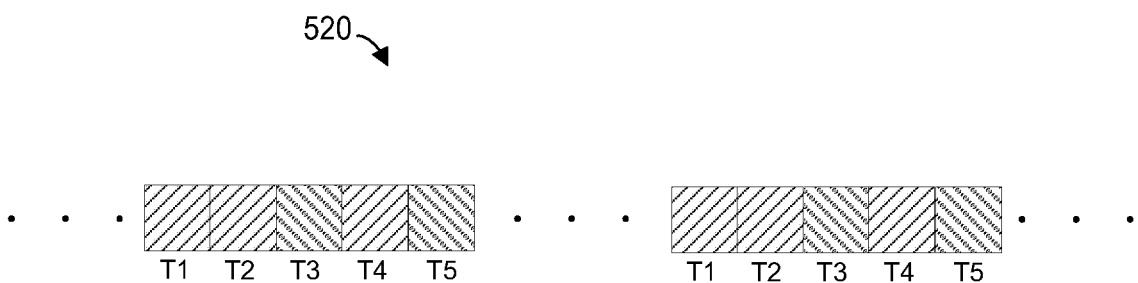
FIG. 7 schematically illustrates an example utilization of time domain resources allocated in accordance with the method of FIG. 6.

FIG. 7 illustrates an example utilization 520 of the allocations of time domain resources resulting from an execution of the method 500 of FIG. 6. In the utilization 520, a set of time domain resources, e.g., time slots T1-T5, are usable for communications of both 5G and 6G RATs. As depicted in FIG. 7, time slots T1, T2, and T4 have been allocated for use in forming 6G communications, and time slots T3 and T5 have been allocated for use in forming 5G communications. In an illustrative example, and simultaneously referring to FIG. 2, based on the allocations of the method 500, the 5G RRC controller 210 at base station 200 may utilize time slots T3 and T5 to form RF signals in accordance with the 5G RAT, and the 6G RRC controller 230 at base station 200 may utilize time slots T1, T2, and T4 to form RF signals in accordance with the 6G RAT. Additionally or alternatively, another 6G RRC controller at another base station may also utilize time slots T1, T2, and T4 to form RF signals in accordance with the 6G RAT based on the allocations of the method 500. As such, time slots T1, T2, and T4 may be utilized by both the 6G RRC controller 220 at base station 200 and the other 6G RRC controller. In this scenario, assignment of the time slots T1, T2, and T4 for use in forming 6G communications, time slot contention-handling, and/or interference mitigation are managed in accordance with the 6G RAT standard, e.g., on an intra-6G basis.

The following additional considerations apply to the foregoing discussion.

A user device in which the techniques of this disclosure can be implemented (e.g., the UE 112) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for utilizing STF resources through the principles disclosed. Thus, while particular embodiments and applications have been illustrated and described, it is to be understood that the disclosed embodiments are not limited to the precise construction and components disclosed. Various modifications, changes and variations, which will be apparent to those of ordinary skill in the art, may be made in the disclosed arrangement, operation, and details of the method and apparatus without departing from the spirit and scope defined in the appended claims.

The following list of aspects reflects a variety of the embodiments explicitly contemplated by the present disclosure.

Aspect 1. A method in one or more wireless network infrastructure elements for utilizing Space-Time-Frequency resources includes: allocating, by processing hardware, a first subset of a plurality of Space-Time-Frequency (STF) resources for communicating in accordance with a first Radio Access Technology (RAT) of a plurality of RATs that utilize a particular frequency spectrum; allocating, by the processing hardware, a second subset of the plurality of STF resources for communicating in accordance with a second RAT of the plurality of RATs; and providing, by the processing hardware, at least one of: (i) a first indication of the allocated first subset of STF resources to a first controller associated with the first RAT, or (ii) a second indication of the allocated second subset of STF resources to a second controller associated with the second RAT.

Aspect 2. The method of aspect 1, where: the plurality of STF resources includes a plurality of spatial domain resources, wherein each spatial domain resource of the plurality of spatial domain resources corresponds to a respective spatial radiation pattern; allocating the first subset of STF resources for communicating in accordance with the first RAT includes allocating, based on the respective spatial radiation patterns of the plurality of spatial domain resources, a first subset of the plurality of spatial domain resources for use in forming first one or more communication beams corresponding to the first RAT, the first one or more communication beams for use in communicating with a first user device; allocating the second subset of STF resources for communicating in accordance with the second RAT comprises allocating, based on the respective spatial radiation patterns of the plurality of spatial domain resources, a second subset of the plurality of spatial domain resources for use in forming second one or more communication beams corresponding to the second RAT, the second one or more communication beams for use in communicating with a second user device; and the respective spatial radiation patterns corresponding to the first subset of spatial domain resources do not overlap with the respective spatial radiation patterns corresponding to the second subset of spatial domain resources.

Aspect 3. The method of aspect 2, where the respective spatial radiation pattern corresponding to the each spatial domain resource includes a respective spatial geometry and optionally includes a respective spatial direction.

Aspect 4. The method of any one of aspects 2-3, where the plurality of STF resources further includes a plurality of time domain resources, and where at least a part of the first one or more beams corresponding to the first RAT and at least a part of the second one or more beams corresponding to the second RAT are formed by using one or more common time domain resources of the plurality of time domain resources.

Aspect 5. The method of any one of aspects 2-4, where: each spatial domain resource of the plurality of spatial domain resources is indicated by a respective resource identifier; providing the first indication of the allocated first subset of spatial domain resources to the first controller comprises providing, to the first controller, an indication of the respective resource identifiers of the allocated first subset of spatial domain resources; and providing the second indication of the allocated second subset of spatial domain resources to the second controller comprises providing, to the second controller, an indication of the respective resource identifiers of the allocated second subset of spatial domain resources.

Aspect 6. The method of aspect 5, further comprising providing an indication of one or more respective spatial radiation patterns corresponding to one or more allocated spatial domain resources in conjunction with providing the indications of the respective resource identifiers of the one or more allocated spatial domain resources.

Aspect 7. The method of any one of aspect 2-6, where: the one or more wireless network infrastructure elements includes the first controller and the second controller; the first controller includes a first portion of the processing hardware; the second controller includes a second portion of the processing hardware; and allocating the first subset of spatial domain resources corresponding to the first RAT and allocating the second subset of spatial domain resources corresponding to the second RAT comprises cooperatively determining, by the first controller and the second controller, at least one of the allocation of the first subset of spatial domain resources corresponding to the first RAT or the allocation of the second subset of spatial domain resources corresponding to the second RAT.

Aspect 8. The method of aspect 7, where: each spatial domain resource of the plurality of spatial domain resources is indicated by a respective resource identifier, and cooperatively determining, by the first controller and the second controller, the at least one of the allocation of the first subset of spatial domain resources corresponding to the first RAT or the allocation of the second subset of spatial domain resources corresponding to the second RAT comprises communicating one or more resource identifiers of the allocated spatial domain resources between the first controller and the second controller.

Aspect 9. The method of any one of aspects 7-8, where: cooperatively determining, by the first controller and the second controller, the at least one of the allocation of the first subset of spatial domain resources corresponding to the first RAT or the allocation of the second subset of spatial domain resources corresponding to the second RAT includes: reserving, by the first controller for use in forming beams in accordance with the first RAT, a first group of spatial domain resources of the plurality of spatial domain resources; and providing, by the first controller to the second controller, an indication of the first group of spatial domain resources, wherein the first subset of spatial domain resources corresponding to the first RAT is the first group of spatial domain resources reserved by the first controller, and the second subset of spatial domain resources corresponding to the second RAT consists of a second group of spatial domain resources that are included in the plurality of spatial domain resources and that are excluded from the first group of spatial domain resources.

Aspect 10. The method of aspect 1, where: the plurality of STF resources includes a plurality of time domain resources; allocating the first subset of STF resources for communicating in accordance with the first RAT comprises allocating a first subset of time domain resources of the plurality of time domain resources for use in forming the first one or more radio frequency signals corresponding to the first RAT; allocating the second subset of STF resources for communicating in accordance with the second RAT comprises allocating a second subset of time domain resources of the plurality of time domain resources for use in forming the second one or more radio frequency signals corresponding to the second RAT; and the first subset of time domain resources and the second subset of time domain resources are mutually exclusive subsets of the plurality of time domain resources.

Aspect 11. The method of aspect 10, where the first subset of time domain resources includes a first set of time slots and the second subset of time domain resources includes a second set of time slots.

Aspect 12. The method of aspect 10, where the first subset of time domain resources is a first set of time-frequency slots and the second subset of time domain resources is a second set of time-frequency slots, the second set of time-frequency slots being orthogonal to the first set of time-frequency slots.

Aspect 13. The method of any one of aspects 10-12, where: the first one or more radio frequency signals corresponding to the first RAT and the second one or more radio frequency signals corresponding to the second RAT are included in a plurality of beams; each beam of the plurality of beams has a respective spatial radiation pattern; and at least one respective spatial radiation pattern of the first one or more beams corresponding to the first RAT at least partially overlaps with at least one respective spatial radiation pattern of the second one or more beams corresponding to the second RAT.

Aspect 14. The method of any one of aspects 10-13, where: a first portion of the processing hardware is included in the first controller; a second portion of the processing hardware is included in the second controller; and allocating the first subset of time domain resources corresponding to the first RAT and allocating the second subset of time domain resources corresponding to the second RAT comprises cooperatively determining, by the first controller and the second controller, at least one of the allocation of the first subset of time domain resources corresponding to the first RAT or the allocation of the second subset of time domain resources corresponding to the second RAT.

Aspect 15. The method of aspect 14, where cooperatively determining, by the first controller and the second controller, the at least one of the allocation of the first subset of time domain resources corresponding to the first RAT or the allocation of the second subset of time domain resources corresponding to the second RAT includes: communicating, by the first controller, an indication of a set of time domain resources utilized for transmissions in accordance with the first RAT, wherein the set of time domain resources utilized for transmissions in accordance the first RAT is allocated as the first subset of time domain resources.

Aspect 16. The method of aspect 15, where communicating, by the first controller, the indication of the set of time domain resources utilized for transmissions in accordance with the first RAT comprises communicating, by the first controller, a configuration of an SSB (Synchronization Signal Block) corresponding to the first RAT.

Aspect 17. The method of aspect 15, where communicating, by the first controller, the indication of the set of time domain resources utilized for transmissions in accordance with the first RAT comprises announcing, by the first controller, a set of time-frequency slots utilized for transmissions in accordance with the first RAT.

Aspect 18. The method of any one of aspects 14-17, where cooperatively determining, by the first controller and the second controller, the at least one of the allocation of the first subset of time domain resources corresponding to the first RAT or the allocation of the second subset of time domain resources allocated to the second RAT includes: obtaining, by the second controller, an indication of a set of time domain resources that are utilized for transmissions in accordance with the first RAT, wherein the set of time domain resources that are utilized for transmissions in accordance with the first RAT are allocated as the first subset of time domain resources.

Aspect 19. The method of aspect 18, further including: based on the obtained indication of the set of time domain resources that are utilized for transmissions in accordance with the first RAT, avoiding, by the second controller, utilization of the indicated set of time domain resources for transmissions in accordance with the second RAT.

Aspect 20. The method of aspect 18, further including: causing, by the second controller, transmissions on least one of an uplink or a downlink corresponding to the second RAT to be rate-matched based on the indicated set of time domain resources that are utilized for transmissions in accordance with the first RAT.

Aspect 21. The method of any one of aspects 18-20 where obtaining the indication of the set of time domain resources that are utilized for transmissions in accordance with the first RAT includes receiving an indication of a configuration of a Synchronization Signal Block (SSB) corresponding to the first RAT.

Aspect 22. The method of any one of aspects 1-6 and 10-13, where the one or more wireless network infrastructure elements includes a centralized allocation controller that is communicatively connected to both the first controller and the second controller, and wherein the processing hardware is included in the centralized allocation controller.

Aspect 23. The method of aspect 22, where providing the at least one of the first indication to the first controller or the second indication to the second controller comprises utilizing, by the centralized allocation controller, one or more Application Programming Interfaces (APIs) to provide the at least one of the first indication to the first controller or the second indication to the second controller.

Aspect 24. The method of aspect 22, where providing the at least one of the first indication to the first controller or the second indication to the second controller comprises transmitting, by the centralized allocation controller, the at least one of the first indication to the first controller or the second indication to the second controller.

Aspect 25. The method of any one of the preceding aspects, where: allocating the first subset of STF resources for communicating in accordance with the first RAT comprises reserving one or more STF resources of the first subset of the plurality of STF resources for communicating exclusively in accordance with the first RAT; and allocating the second subset of STF resources for communicating in accordance with the second RAT comprises reserving one or more STF resources of the second subset of the plurality of STF resources for communicating exclusively in accordance with the second RAT.

Aspect 26. The method of any one of the preceding aspects, where at least one of: allocating the first subset of the plurality of STF resources for communicating in accordance with the first RAT comprises dynamically allocating, based on a detected dynamic condition, at least one STF resource of the first subset of STF resources for communicating in accordance with the first RAT; or allocating the second subset of the plurality of STF resources for communicating in accordance with the second RAT comprises dynamically allocating, based on the detected dynamic condition, at least one STF resource of the second subset of STF resources for communicating in accordance with the second RAT.

Aspect 27. A method including the methods of both of aspects 25 and 26, where: providing, the at least one of: (i) the first indication of the allocated first subset of STF resources to the first controller corresponding to the first RAT, or (ii) the second indication of the allocated second subset of STF resources to the second controller corresponding to the second RAT comprises at least one of: (i) providing, to the first controller, an indication of the one or more STF resources reserved for communicating exclusively in accordance with the first RAT and an indication of the dynamically allocated at least one STF resource of the first subset of STF resources corresponding to the first RAT; or (ii) providing, to the second controller, an indication of the one or more STF resources reserved for communicating exclusively in accordance with the second RAT and an indication of the dynamically allocated at least one resource of the second subset of STF resources corresponding to the second RAT.

Aspect 28. The method of any one of aspects 26-27, further comprising detecting an occurrence of a dynamic condition to provide the detected dynamic condition.

Aspect 29. The method of the preceding aspects, where detecting the occurrence of the dynamic condition includes detecting an occurrence of at least one of: a traffic demand corresponding to the first RAT, a traffic demand corresponding to the second RAT, a traffic shaping corresponding to the first RAT, a traffic shaping corresponding to the second RAT, a bandwidth requirement and/or usage corresponding to the first RAT, or a bandwidth requirement and/or usage corresponding to the second RAT.

Aspect 30. The method of any one of the preceding aspects, where providing the least one of the first indication to the first controller or the second indication to the second controller causes concurrent delivery of (i) first data between one or more radios that operate in accordance with the first RAT and a respective user device via a first one or more radio frequency signals formed using the allocated first subset of STF resources, and (ii) second data between one or more radios that operate in accordance with the second RAT and a respective user device via a second one or more radio frequency signals formed using the allocated second subset of STF resources.

Aspect 31. The method of any one of the preceding aspects, where: allocating the first subset of the plurality of STF resources for communicating in accordance with the first RAT comprises allocating the first subset of the plurality of STF resources for communicating in accordance with the first RAT over a first portion of the particular frequency spectrum; allocating the second subset of the plurality of STF resources for communicating in accordance with the second RAT comprises allocating the second subset of the plurality of STF resources for communicating in accordance with the second RAT over a second portion of the particular frequency spectrum; and the first portion of the frequency spectrum and the second portion of the frequency spectrum are mutually-exclusive portions of the frequency spectrum.

Aspect 32. One or more non-transitory media respectively storing thereon instructions that, when executed by the processing hardware, cause one or more communications systems to perform a method according to any one of the preceding aspects, the processing hardware included in the one or more communications systems.

Aspect 33. Any one of the preceding aspects in combination with any other one of the preceding aspects.

Aspect 34. An aspect of any one of aspects 1-32, where the particular frequency spectrum includes a 3.5 GHz band.

Aspect 35. An aspect of any one of aspects 1-32, where the particular frequency spectrum includes a mmWave frequency band.

Aspect 36. An aspect of any one of aspects 1-32, where: a first portion of the plurality of STF resources is utilized at a first base station; and a second portion of the plurality of STF resources is utilized at a second base station.

Aspect 37. An aspect of any one of aspects 1-32, where the plurality of STF resources is utilized at only one base station.

Aspect 38. An aspect of any one of aspects 1-32, where the first RAT is 5G NR.

Aspect 39. An aspect of any one of aspects 1-32, where the second RAT is 6G.

Aspect 40. An aspect of any one of aspects 1-32, where the first RAT operates according to a standard, and the second RAT operates according a later version or a later generation of the standard.

Aspect 41. An aspect of any one of aspects 1-32, where the first RAT operates according to a particular standard, and the second RAT operates according to a different standard.

Aspect 42. The preceding aspect, where the particular standard is a cellular communications standard, and the different standard is a wireless networking standard.

Aspect 43. Any one of aspects 41 or 42, where the different standard is an IEEE 802.11 wireless networking standard.

Aspect 44. Any one of aspects 41 or 42, where the different standard is an IEEE 802.16 wireless networking standard.

Aspect 45. Any one of aspects 40 to 44, where the first RAT and the second RAT are supported within a single base station.

Aspect 46. An aspect of any one of aspects 1-32, where at least one of the allocating of the first subset of STF resources for communicating in accordance with the first RAT or the allocating of the second subset of STF resources for communicating accordance with the second RAT is performed on demand.

Aspect 47. An aspect of the previous aspects, where the demand for the at least one of the allocating of the first subset of STF resources for communicating in accordance with the first RAT or the allocating of the second subset of STF resources for communicating in accordance with the second RAT is issued by the first controller, the second controller, or a centralized controller that is communicatively connected to both the first controller and the second controller.

Aspect 48. An aspect of any one of aspects 1-32, further including providing, by the processing hardware, at least one of: (i) the first indication of the allocated first subset of STF resources to the second controller associated with the second RAT, or (ii) the second indication of the allocated second subset of STF resources to the first controller associated with the first RAT.

What is claimed is:

1. A method in one or more wireless network infrastructure elements for utilizing radio interface resources, the method comprising:
    allocating, by a centralized allocation controller, a first subset of a plurality of spatial domain resources for communicating in accordance with a first Radio Access Technology (RAT) and using a particular frequency spectrum;
    allocating, by the centralized allocation controller, a second subset of the plurality of spatial domain resources for communicating in accordance with a second RAT, which is different from the first RAT, and using the particular frequency spectrum, so that spatial radiation patterns corresponding to the first subset of spatial domain resources and to the second subset of spatial resources do not overlap; and
    providing, by the centralized allocation controller(i) a first indication of the allocated first subset of spatial domain resources to a first controller associated with the first RAT, and (ii) a second indication of the allocated second subset of spatial domain resources to a second controller associated with the second RAT.

2. The method of claim 1, wherein the spatial radiation patterns corresponding to the first subset of spatial domain resources and to the second subset of spatial resources include a respective spatial geometry and optionally includes a respective spatial direction.

3. The method of claim 1, wherein:
    the first subset of the plurality of spatial domain resources are for forming first one or more communication beams corresponding to the first RAT, to communicate with a first user device; and
    the second subset of the plurality of spatial domain resources are for forming second one or more communication beams corresponding to the second RAT, to communicate with a second user device.

4. The method of claim 3, further comprising:
    allocating a plurality of time domain resources for communicating in accordance with the first RAT and the second RAT, wherein at least a part of the first one or more beams and at least a part of the second one or more beams are formed by using one or more common time domain resources of the plurality of time domain resources.

5. The method of claim 3, further comprising:
    allocating a plurality of frequency domain resources for communicating in accordance with the first RAT and the second RAT, wherein at least a part of the first one or more beams and at least a part of the second one or more beams are formed by using one or more common frequency domain resources of the plurality of frequency domain resources.

6. The method of claim 3, wherein:
    the one or more wireless network infrastructure elements includes the first controller and the second controller;
    the first controller includes a first portion of the centralized allocation controller;
    the second controller includes a second portion of the centralized allocation controller; and allocating the first subset of spatial domain resources corresponding to the first RAT
    and allocating the second subset of spatial domain resources corresponding to the second RAT comprises cooperatively determining, by the first controller and the second controller, at least one of the allocation of the first subset of spatial domain resources corresponding to the first RAT or the allocation of the second subset of spatial domain resources corresponding to the second RAT.

7. The method of claim 6, wherein:
    each spatial domain resource of the plurality of spatial domain resources is indicated by a respective resource identifier; and
    cooperatively determining, by the first controller and the second controller, the at least one of the allocation of the first subset of spatial domain resources corresponding to the first RAT or the allocation of the second subset of spatial domain resources corresponding to the second RAT comprises communicating one or more resource identifiers of the allocated spatial domain resources between the first controller and the second controller.

8. The method of claim 6, wherein:
    cooperatively determining, by the first controller and the second controller, the at least one of the allocation of the first subset of spatial domain resources corresponding to the first RAT or the allocation of the second subset of spatial domain resources corresponding to the second RAT comprises:
    reserving, by the first controller for use in forming beams in accordance with the first RAT, a first group of spatial domain resources of the plurality of spatial domain resources; and
    providing, by the first controller to the second controller, an indication of the first group of spatial domain resources,
    wherein the first subset of spatial domain resources corresponding to the first RAT is the first group of spatial domain resources reserved by the first controller, and the second subset of spatial domain resources corresponding to the second RAT consists of a second group of spatial domain resources that are included in the plurality of spatial domain resources and that are excluded from the first group of spatial domain resources.

9. The method of claim 1, wherein:
    each spatial domain resource of the plurality of spatial domain resources is indicated by a respective resource identifier;
    providing the first indication of the allocated first subset of spatial domain resources to the first controller comprises providing, to the first controller, an indication of the respective resource identifiers of the allocated first subset of spatial domain resources; and providing the second indication of the allocated second subset of spatial domain resources to the second controller comprises providing, to the second controller, an indication of the respective resource identifiers of the allocated second subset of spatial domain resources.

10. The method of claim 9, further comprising providing an indication of one or more respective spatial radiation patterns corresponding to one or more allocated spatial domain resources in conjunction with providing the indications of the respective resource identifiers of the one or more allocated spatial domain resources.

11. The method of claim 1, wherein:
allocating the first subset of spatial domain resources for communicating in accordance with the first RAT comprises reserving one or more spatial domain resources for communicating exclusively in accordance with the first RAT; and
allocating the second subset of spatial domain resources for communicating in accordance with the second RAT comprises reserving one or more spatial domain resources for communicating exclusively in accordance with the second RAT.

12. The method of claim 1, wherein at least one of:
allocating the first subset of the plurality of spatial domain resources for communicating in accordance with the first RAT includes dynamically allocating, based on a detected dynamic condition, at least one spatial domain resource for communicating in accordance with the first RAT; or
allocating the second subset of the plurality of spatial domain resources for communicating in accordance with the second RAT includes dynamically allocating, based on the detected dynamic condition, at least one spatial domain resource for communicating in accordance with the second RAT.

13. The method of claim 12, wherein detecting an occurrence of the dynamic condition includes detecting an occurrence of at least one of:
a traffic demand corresponding to the first RAT,
a traffic demand corresponding to the second RAT, a traffic shaping corresponding to the first RAT, a traffic shaping corresponding to the second RAT,
a bandwidth requirement and/or usage corresponding to the first RAT, or a bandwidth requirement and/or usage corresponding to the second RAT.

14. The method of claim 1, wherein the providing of the first indication and the second indication enables concurrent delivery of:
first data via a first downlink from the first controller to a first user device by utilizing the allocated first subset of spatial domain resources, and
second data via a second downlink from the second controller to a second user device by utilizing the allocated second subset of spatial domain resources, the first data and the second data being delivered by the particular frequency spectrum.

15. One or more non-transitory media respectively storing thereon instructions that, when executed by a centralized allocation controller, cause one or more communications systems to:
allocate a first subset of a plurality of spatial domain resources for communicating in accordance with a first Radio Access Technology (RAT) and using a particular frequency spectrum;
allocate a second subset of the plurality of spatial domain resources for communicating in accordance with a second RAT, which is different from the first RAT, and using the particular frequency spectrum, so that spatial radiation patterns corresponding to the first subset of spatial domain resources and to the second subset of spatial resources; and
provide (i) a first indication of the allocated first subset of spatial domain resources to a first controller associated with the first RAT, and (ii) a second indication of the allocated second subset of spatial domain resources to a second controller associated with the second RAT, thereby causing concurrent delivery of first data via the allocated first subset of spatial domain resources and second data via the allocated second subset of spatial domain resources.

16. The one or more non-transitory media of claim 15, wherein:
the first subset of the plurality of spatial domain resources are for forming first one or more communication beams corresponding to the first RAT, to communicate with a first user device;
the second subset of the plurality of spatial domain resources are for forming second one or more communication beams corresponding to the second RAT, to communicate with a second user device; and
the spatial radiation patterns corresponding to the first subset of spatial domain resources and to the second subset of spatial resources include a respective spatial geometry and optionally includes a respective spatial direction.

17. The one or more non-transitory media of claim 16, wherein the instructions, when executed by the centralized allocation controller, cause the one or more communications systems further to at least one of:
allocate a plurality of time domain resources for communicating in accordance with the first RAT and the second RAT, wherein at least a part of the first one or more beams and at least a part of the second one or more beams are formed by using one or more common time domain resources of the plurality of time domain resources; or
allocate a plurality of frequency domain resources for communicating in accordance with the first RAT and the second RAT, wherein at least a part of the first one or more beams and at least a part of the second one or more beams are formed by using one or more common frequency domain resources of the plurality of frequency domain resources.

18. The one or more non-transitory media of claim 15 included in a centralized allocation controller that is communicatively connected to both the first controller and the second controller.

19. The one or more non-transitory media of claim 15, wherein:
the first controller includes a first portion of the one or more non-transitory media; the second controller includes a second portion of the one or more non-transitory media; and
the first controller and the second controller cooperatively determine the allocation of the first subset of spatial domain resources corresponding to the first RAT and the allocation of the second subset of spatial domain resources corresponding to the second RAT.

20. The one or more non-transitory media of claim 15, wherein at least one of: the allocation of the first subset of the plurality of spatial domain resources is a first dynamic allocation based on an occurrence of a dynamic condition;

the allocation of the first subset of the plurality of spatial domain resource is a second dynamic allocation based on the occurrence of the dynamic condition; and the dynamic condition includes at least one of:
a traffic demand corresponding to the first RAT,
a traffic demand corresponding to the second RAT, a traffic shaping corresponding to the first RAT, a traffic shaping corresponding to the second RAT,
a bandwidth requirement and/or usage corresponding to the first RAT, or a bandwidth requirement and/or usage corresponding to the second RAT.

21. The one or more non-transitory media of claim 15, wherein:
each spatial domain resource of the plurality of spatial domain resources is indicated by a respective resource identifier;
the first indication of the allocated first subset of spatial domain resources includes an indication of the respective resource identifiers and optionally an indication of one or more respective radiation patterns of the allocated first subset of spatial domain resources; and
the second indication of the allocated second subset of spatial domain resources includes an indication of the respective resource identifiers and optionally one or more respective radiation patterns of the allocated second subset of spatial domain resources.

22. The one or more non-transitory media of claim 15, wherein to provide of the first indication and the second indication enables concurrent delivery of:
first data via a first downlink from the first controller to a first user device by utilizing the allocated first subset of spatial domain resources, and
second data via a second downlink from the second controller to a second user device by utilizing the allocated second subset of spatial domain resources, the first data and the second data being delivered by the particular frequency spectrum.

* * * * *